March 13, 1956     E. O. LAWRENCE     2,737,779
CONDENSABLE VAPOR EXTRACTION APPARATUS
Filed May 24, 1946
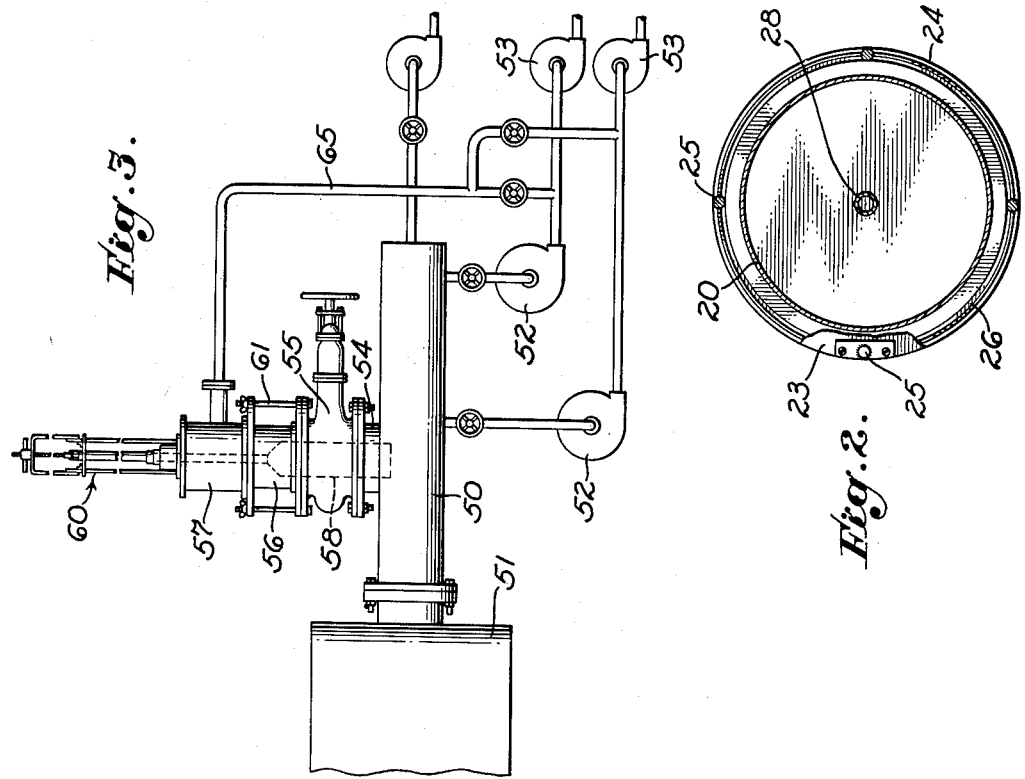
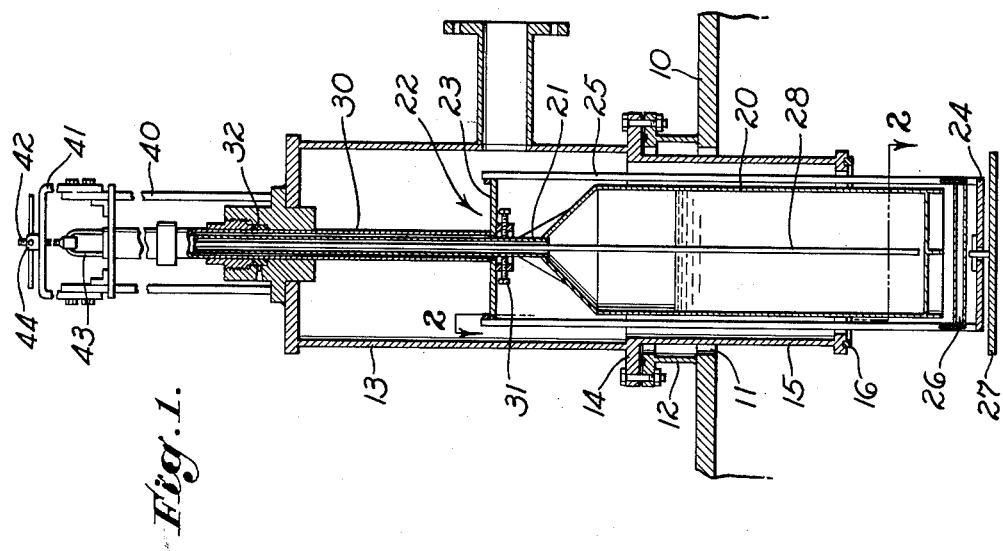
INVENTOR.
ERNEST O. LAWRENCE
BY
ATTORNEY.

United States Patent Office 2,737,779
Patented Mar. 13, 1956

2,737,779
CONDENSABLE VAPOR EXTRACTION APPARATUS

Ernest O. Lawrence, Berkeley, Calif., assignor to the United States of America as represented by the United States Atomic Energy Commission Application May 24, 1946, Serial No. 672,042

8 Claims. (Cl. 62—1)

The present invention relates to vacuum apparatus, and more particularly to a retractable moisture trap used to condense condensable vapors in a space to be evacuated, during pump-down period, and thereafter to be sealed off or withdrawn from the evacuated space.

It has been found that the initial pump-down period of large tanks which are to be employed at very low pressures may be substantially halved by employing traps filled with liquid air, liquid nitrogen, or the like. After initial pump-down, the desired degree of vacuum may be maintained by the pumping system without further necessity for traps. However, as long as the traps remain in the space, they must remain filled with the coolant to prevent melting or evaporation of the frozen vapors. This, of course, entails a wasteful expenditure of the coolant, especially since it is customary to operate the tank for periods which may be several days.

It is an object of this invention to effect important economies in coolant in moisture traps employed in high vacuum apparatus.

It is a feature of the present invention to provide a moisture trap in a space to be evacuated during initial pump-down, and to provide means implementing withdrawal of the trap from the space after completion of initial pump-down.

It is a further feature of the present invention to provide such trap so that it may be completely disassociated from the vessel being evacuated after completion of initial pump-down.

Other objects will become apparent as the description proceeds, especially when taken in conjunction with the appended drawings, in which:

Figure 1 is a fragmentary section through a moisture trap constructed in accordance with the present invention;

Fig. 2 is a section on the line 2—2, Fig. 1; and

Fig. 3 is an elevation of a somewhat modified form of the invention.

Referring first to Figs. 1 and 2, there is indicated at 10 a portion of a vessel to be evacuated, the vessel having an opening 11 therein for introduction of a moisture trap. Flanged collar 12 surrounds the opening 11. A cylindrical housing 13 is provided with a flange 14 engageable in sealing relation with the flange or collar 12. Extending into the tank or vessel 10 from the flange 14 is a tubular, elongated collar 15 having a sealing gasket 16 provided at its inner end.

The moisture trap 20 is herein illustrated as a generally cylindrical container having an elongated neck 21 extending outwardly therefrom, through which coolant may be introduced and permitting exhaust of vapor as the coolant, which may be liquid air or liquid nitrogen, evaporates. If desired, a vent tube 28 may be provided inside of and concentric with tube 21, and extending nearly to the bottom of flask 20. Appropriate valves (not shown) may be provided to selectively close the upper ends of tubes 21 and 28. Normally, tube 21 is open and permits escape of gas or vapor resulting from evaporation of refrigerant in flask 20. However, when it is desired to empty flask 20 in place, the upper end of tube 21 may be closed and the upper end of tube 28 may be opened, and gas pressure building up in flask 20 will force the liquid remaining therein up and out of vent tube 28. The trap 20 is surrounded by a supporting and protecting cage 22 which comprises a top plate 23, a bottom plate 24 and rods 25. Adjacent the bottom of the cage 22 is secured a shallow cup 26 designed to catch moisture or foreign material dropping off the moisture trap 20.

Pinned to the bottom of the cage 22 so as to have limited movement relative thereto, is a valve plate 27, adapted to sealingly engage the gasket 16 when the cage 22 is moved upwardly.

Extending upward from the cage 22 is a supporting tube 30, through which extends the neck 21 of the flask or trap 20. The flask or trap 20 and cage 22 are secured together by set screws 31 carried by plate 23 and engaging the neck 21.

The tube 30 extends through a sealing gland indicated generally at 32, and is vertically movable therethrough. Means are provided for raising the cage 22 and trap 20 until valve 27 engages gasket 16, and this means may take the form of a frame 40, having a cross bar 41 at its top. An elongated bolt 42 extends through the cross bar and engages a bail 43 secured to the top of tube 30. A nut 44, preferably provided with capstan-like handles for turning the same, engages the top of cross bar 41 and is threaded to bolt 42. Rotation of nut 44 draws the cage 22 and associated trap 20 upwardly until valve 27 seats on gasket 16.

After the valve 27 has sealed the interior of the tank 10 from atmosphere, coolant need no longer be supplied to the trap 20. Any moisture which has condensed thereon, and which then melts, will be caught in trap 26, and may be removed by disassembly at flange 14 between operations.

However, it is in some respects more advantageous to be able to remove the moisture trap completely, and for this purpose, the construction may be modified as shown in Fig. 3.

In this figure, there is shown the trap structure secured to a manifold 50 connected to a vessel 51 to be evacuated. Vacuum pumps are shown at 52, connected to the manifold and discharging into conventional backing pumps 53. A flanged collar 54 is secured around an opening in manifold 50, and supports a positive closing valve 55, the valve element of which is retractable to the right in the figure to a position where it permits free access to the interior of manifold 50 through collar 54.

Secured above the valve 55 are tubular housings 56 and 57 serving the same purpose as tubular housing 13 in Fig. 1. Located within the housings 56 and 57, and movable vertically therein, is a trap and cage assembly 58 which may be identical to trap 20 and cage 22 shown in Fig. 1, although a valve such as valve 27 need not be employed, since valve 55 takes its place. Means for lifting or withdrawing the trap are indicated at 60.

Housing elements 56 and 57 are secured to the top of valve 55 by releasable clamping means 61, so that after the trap has been elevated above the valve 55, and after the valve 55 has been closed, the entire structure above the valve may be removed and completely disassociated from the manifold 50 and tank or vessel 51.

In order to reduce the possibility of leakage past the moisture trap 20, a line 65 may be connected to the housing member 57 and to backing pumps 53.

While I have illustrated and described in detail two preferred embodiments of my retractable moisture trap, it will be understood that this has been done merely to enable those skilled in the art to practice the invention, the scope of which is indicated by the appended claims.

What is claimed is:
1. In combination with a vacuum apparatus comprising a vessel to be evacuated and having a high vacuum pumping apparatus connected thereto, a moisture trap comprising a flask adapted to contain a coolant such as liquid air, liquid nitrogen, or the like, means for supporting said flask with its exterior in contact with the atmosphere in said vessel, and means operable to seal off said flask from the atmosphere in said vessel without opening said vessel to exterior atmosphere.

2. In combination with a vacuum apparatus comprising a vessel to be evacuated and having a high vacuum pumping apparatus connected thereto, a moisture trap comprising a flask adapted to contain a coolant such as liquid air, liquid nitrogen, or the like, means for supporting said flask with its exterior in contact with the atmosphere in said vessel, and means operable to seal off said flask from the atmosphere in said vessel without opening said vessel to exterior atmosphere, said supporting means including releasable connections providing for complete detachment of said flask from said vessel subsequent to operation of said sealing means.

3. In combination with a vacuum apparatus comprising a vessel to be evacuated and having a high vacuum pumping apparatus connected thereto for evacuating the same, said vessel having an opening in a wall thereof, a vacuum-tight housing overlying the opening in said wall and extending exteriorly of said vessel, a flask adapted to contain a coolant such as liquid air, liquid nitrogen or the like, supported in said housing and movable between positions in which said flask extends into said vessel and in which said flask is completely received in said housing, and sealing means operated by movement of said flask to said last named position effective to seal off the interior of said housing from the interior of said vessel when said flask is completely received in said housing.

4. In combination with a vacuum apparatus comprising a vessel to be evacuated and having a high vacuum pumping apparatus connected thereto for evacuating the same, said vessel having an opening in a wall thereof, a valve unit for sealing said opening having a valve movable between a seating position and an open position in which said valve leaves said opening unobstructed, a vacuum-tight housing overlying said valve unit, a flask adapted to contain liquid air, liquid nitrogen or the like, in said housing and movable therein between a position in which said flask extends into said vessel and a position in which said flask is completely received in said housing above said valve.

5. In combination with a vacuum apparatus comprising a vessel to be evacuated and having a high vacuum pumping apparatus connected thereto for evacuating the same, said vessel having an opening in a wall thereof, a valve unit for sealing said opening having a valve movable between a seating position and an open position in which said valve leaves said opening unobstructed, a vacuum-tight housing overlying said valve unit, a flask adapted to contain liquid air, liquid nitrogen or the like, in said housing and movable therein between a position in which said flask extends into said vessel and a position in which said flask is completely received in said housing above said valve, and releasable securing means securing said housing to said valve unit whereby said housing and flask may be removed from said valve unit.

6. In combination with a vacuum apparatus comprising a vacuum-tight vessel and having a high vacuum pumping apparatus connected thereto, a moisture trap adapted to contain liquid refrigerant located at least partially in said vessel, a first tube connecting to the top of said trap and extending through a wall of said vessel, a second tube inside said first tube but extending adjacent to the bottom of said vessel, means for selectively closing said tubes whereby said first tube provides for escape of vapor as formed when open, and said second tube provides for displacement of liquid refrigerant from said trap when said first tube is closed and said second tube is open.

7. A condensable vapor extraction apparatus including, a housing mounting said apparatus adjacent an aperture within the wall of a vessel containing an atmosphere with a condensable vapor content, a flask having a refrigerated outer surface, means supporting said flask within said housing, retracting means connected to said flask and adapted selectively to move the same into and out of contact with the atmosphere within the vessel, and valve means adapted to provide a seal between the housing and the atmosphere within the vessel, whereby the aperture may be closed by the valve means when the flask has been retracted.

8. A condensable vapor extraction apparatus including, a housing mounting said apparatus adjacent an aperture within the wall of a vessel containing an atmosphere with a condensable vapor content, a flask having a refrigerated outer surface, means supporting said flask within said housing, a condensate container supported by said supporting means, retracting means connected to said flask and adapted selectively to move the same into and out of contact with the atmosphere within the vessel, and valve means adapted to provide a seal between the housing and the atmosphere within the vessel, whereby the aperture may be closed by the valve means when the flask and condensate container have been retracted.

References Cited in the file of this patent
UNITED STATES PATENTS

| | | |
|---|---|---|
| 1,307,999 | Buckley | June 24, 1919 |
| 2,214,838 | McGavock | Sept. 17, 1940 |